(12) United States Patent
Reynolds et al.

(10) Patent No.: US 7,369,956 B2
(45) Date of Patent: May 6, 2008

(54) SYSTEM FOR TESTING TIRE SIDEWALL IRREGULARITIES AND RELATED METHODS

(75) Inventors: Brandon M. Reynolds, Akron, OH (US); Troy L. Anenson, Uniontown, OH (US)

(73) Assignee: Commercial Time Sharing, Inc., Akron, OH (US)

( * ) Notice: Subject to any disclaimer, the term of this patent is extended or adjusted under 35 U.S.C. 154(b) by 0 days.

(21) Appl. No.: 11/260,033

(22) Filed: Oct. 25, 2005

(65) Prior Publication Data

US 2007/0093981 A1    Apr. 26, 2007

(51) Int. Cl.
G06F 19/00    (2006.01)
G01B 5/28    (2006.01)

(52) U.S. Cl. .......................................... 702/113; 702/35
(58) Field of Classification Search ................ 702/113
See application file for complete search history.

(56) References Cited

U.S. PATENT DOCUMENTS

| | | | |
|---|---|---|---|
| 4,311,044 A * | 1/1982 | Marshall et al. ............... | 73/146 |
| 4,402,218 A * | 9/1983 | Engel ........................... | 73/146 |
| 4,910,411 A * | 3/1990 | Teraguchi et al. ....... | 250/559.44 |
| 5,323,646 A | 6/1994 | Poling, Sr. | |
| 6,005,388 A * | 12/1999 | Kaefer-Hoffmann et al. .... | 324/240 |
| 6,119,514 A * | 9/2000 | Piacente et al. ............... | 73/146 |
| 6,539,789 B1 | 4/2003 | Kostka et al. | |
| 7,012,701 B2 * | 3/2006 | Hassler et al. ............... | 356/601 |
| 2005/0257609 A1 * | 11/2005 | Mancosu et al. ............. | 73/146 |

* cited by examiner

*Primary Examiner*—Michael P. Nghiem
(74) *Attorney, Agent, or Firm*—Renner Kenner Greive Bobak Taylor & Weber

(57) ABSTRACT

A device for testing a tire that has a tread and extending sidewalls includes an apparatus for receiving and rotating a tire and at least one measurement device operatively placed to measure at least one of the sidewalls as the tire is rotated wherein the measurement device is radially moveable with respect to the sidewall in defined increments so as to obtain a measurement profile for each radial position. A controller is connected to the measurement device and receives each measurement profile, wherein the controller classifies the measurement profile into slope classifications, and wherein the controller monitors the slope classifications for defective patterns and, if detected, monitors a second measurement profile for another defective pattern. If another defective pattern is detected in the second measurement profile in the same radial region, the controller generates an indication that the tire is defective.

32 Claims, 3 Drawing Sheets

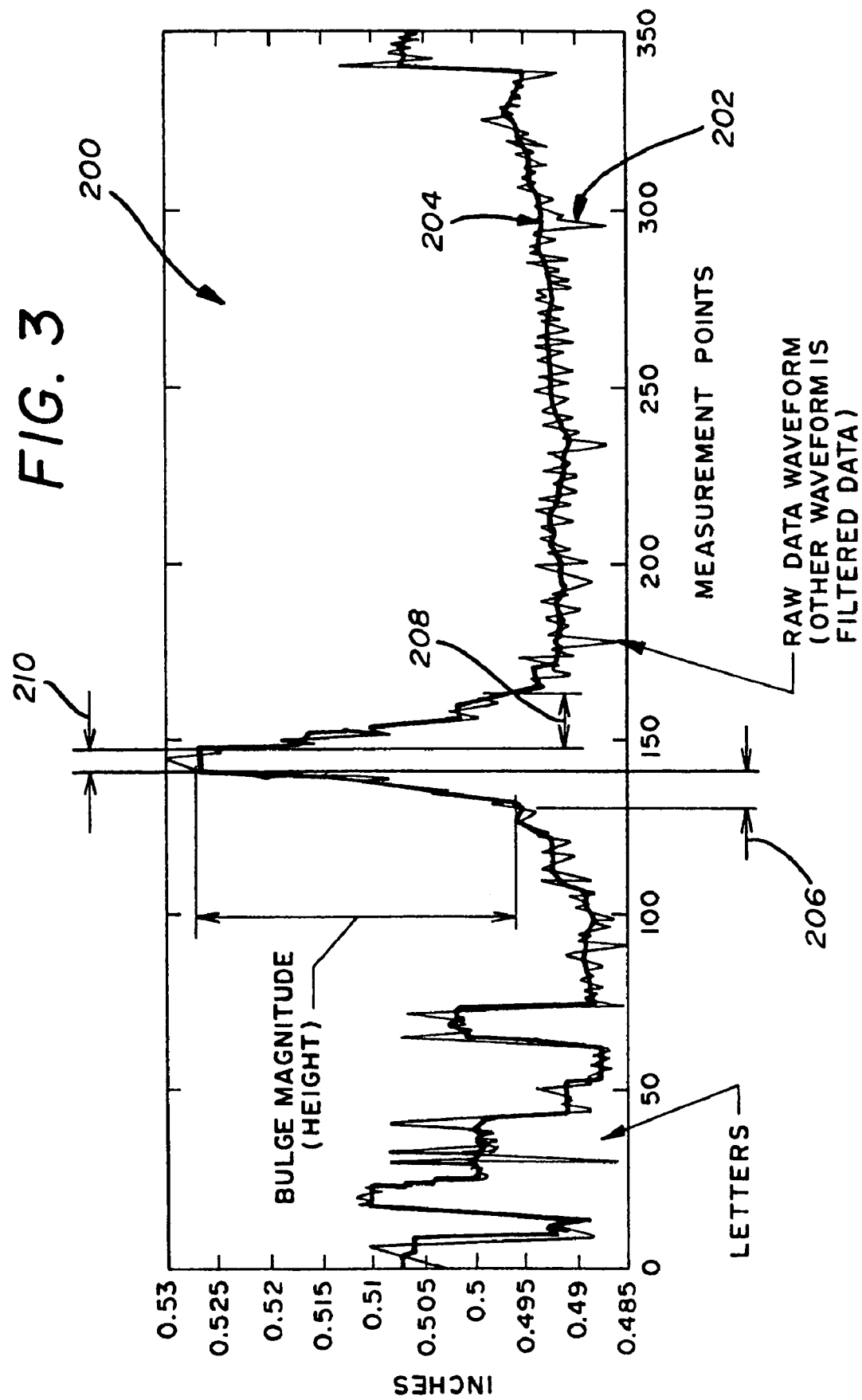

SYSTEM FOR TESTING TIRE SIDEWALL IRREGULARITIES AND RELATED METHODS

TECHNICAL FIELD

The present invention relates generally to tire testing equipment. In particular, the present invention relates to a testing device employed in the measurement of tire sidewalls as part of a production line test. Specifically, the present invention relates to tire testing equipment in that it uses a filtering process that ignores lettering and other acceptable process-related surface features on the sidewalls and detects bulges and depressions.

BACKGROUND ART

Tire uniformity machines and their use and function in the production and testing of vehicle tires are well-known in the art. One of the more important tests in this regard is the detection of so-called bulges, or depressions on the tire sidewalls. Bulges and depressions are indicative of tire construction faults which can affect the safety of the end user. The primary difficulty in the detection of such fault features lies in the fact that the areas under test include intentional sculptural features, such as raised relief-type letters, and acceptable process-related surface irregularities such as pin vents or mold flash that obscure the faults. The acceptable surface features are of such a size that it is sometimes difficult to distinguish them from a bulge or depression. As a result, simple threshold value decisions on the basis of measured form data does not lead to the clear distinction between fault features and acceptable surface features.

It will be appreciated that the manufacturer of the vehicle tire may find faults in the inner construction of the tire which significantly affect the mechanical properties and thus the reliability of the tire. Construction faults show up as bulges or depressions on the exterior tire surface. An open splice in one of the construction plies, for example, is visible as a bulge. Such tires must be removed to ensure the safety of the end user. The construction faults are most likely to be found on the sidewalls and thus are superimposed on the sidewall surfaces of the tire. Accordingly, the lateral and vertical dimensions of such a bulge or depression are comparable with the lettering or other acceptable surface features which are also present. Although various methods have been developed to detect these bulges and depressions, they have been found to be lacking.

One particular attempt to address this problem is disclosed in U.S. Pat. No. 6,539,789 which employs the use of a laser fan beam that is diffusely reflected by the tire sidewall and recorded by a camera having an image sensor. By utilizing a sophisticated set of optics, the diffusely reflected radiation is quantified and from the known geometry of the measurement arrangement together with position of the projected line of the sensor surface, the form of the illuminated surface is then calculated in a manner known in the art. In particular, the system disclosed in the '789 patent employs a low pass filter applied to the structures and irregularities. This filter has the effect of suppressing the height of structures which have edges which appear as high frequency characteristics. This surface is then normalized to a quasi-planar state by subtracting the torus form of the tire. This is necessitated by the processing algorithm which works in a planar geometry. Next, all values representing height that exceed a certain threshold value are considered to contribute to an area if that area is big enough, it is then considered to be a bulge and the tire is marked as defective. Depressions can be similarly detected except for the fact that the threshold value is a negative value. Although the foregoing method is somewhat effective it is believed that it has certain drawbacks. In particular, in view of the minimal difference between the size of bulges ranging about 0.012 inches in size, and the lettering of the tire ranging about 0.040 inches in size, it is still quite difficult to distinguish between the two and correctly designate a tire as having a bulge or depression in certain instances. Therefore, there is a need in the art for improved measurement of structural defects and for processing the measured information in a manner that more reliably designates the detection of bulges and depressions in tire sidewalls.

SUMMARY OF THE INVENTION

In light of the foregoing, it is a first aspect of the present invention to provide a system for testing tire sidewall irregularities and related methods.

It is another aspect of the present invention to provide a device for testing a tire that has a tread and extending sidewalls comprising an apparatus for receiving and rotating a tire and at least one measurement device operatively placed to measure at least one of the sidewalls as the tire is rotated. The measurement device is radially moveable with respect to the sidewall in defined increments so as to obtain a measurement profile for each radial position. A controller is connected to the measurement device and receives each measurement profile, wherein the controller classifies the measurement profile into slope classifications, and wherein the controller monitors the slope classifications for defective patterns. If a defective pattern is detected, the controller monitors a second measurement profile for another defective pattern, and, if another defective pattern is detected in about the same radial position, the controller generates an indication that the tire is defective.

Other aspects of the present invention are attained by a method for detecting irregularities in a surface, comprising positioning a measuring device in relation to the surface to be measured and moving the measuring device and the surface with respect to the other. The method further includes the steps of collecting a plurality of data points during the moving step which collectively form a measurement profile; classifying the measurement profile into slope classifications; and comparing the slope classifications to defective patterns. The method concludes with the step of generating an indication that the surface is defective if a defective pattern is found.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 3 is an exemplary waveform analyzed by the processing steps.

BEST MODE FOR CARRYING OUT THE INVENTION

Figure 1:
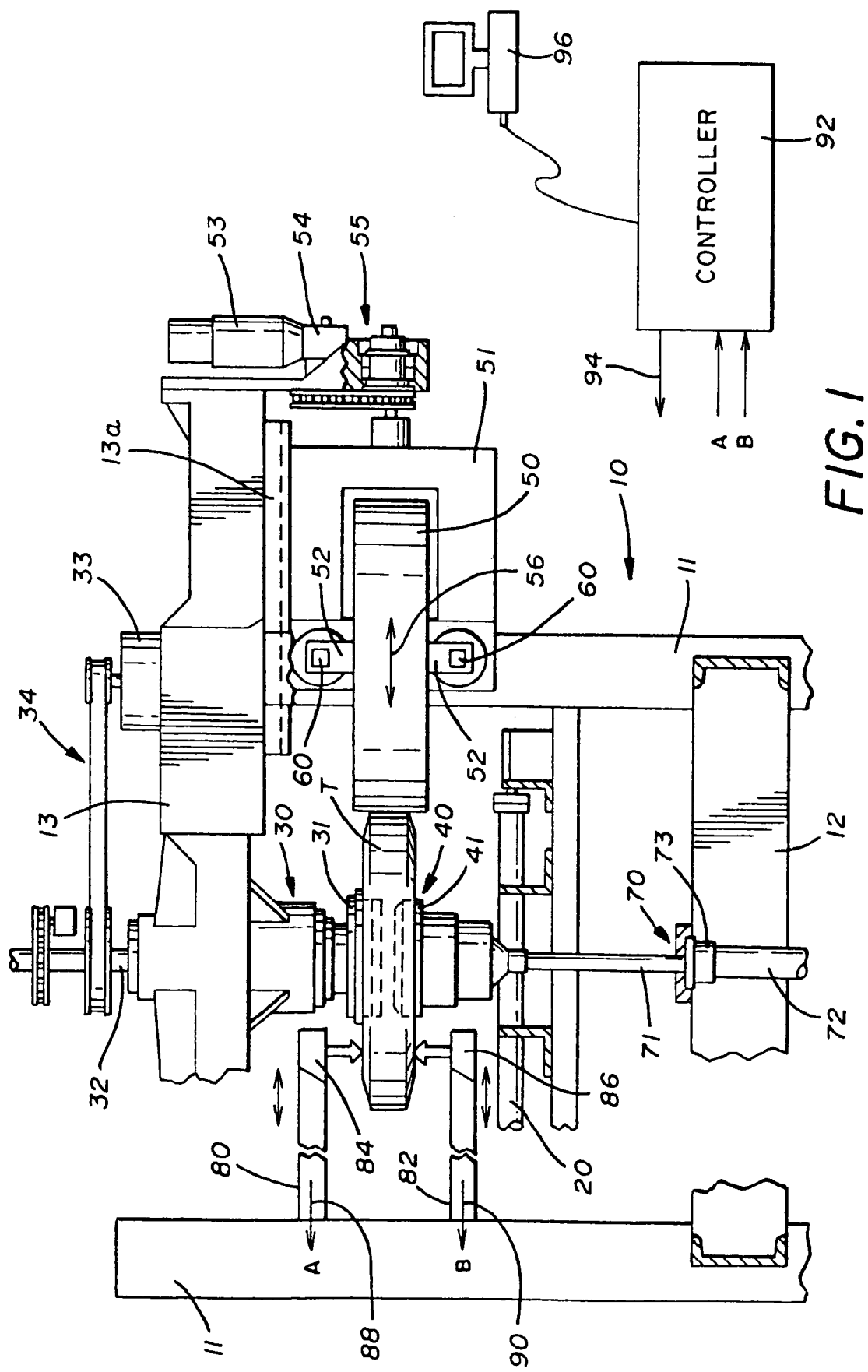
FIG. 1 is an elevational view, partially in cross-section and partially schematic, showing a tire uniformity machine made in accordance with the present invention.

Referring first to FIG. 1 for a general description of the tire uniformity machine which is generally indicated by the numeral 10, it will be noted that vertical side frame members 11 and horizontal bottom and top frame members 12 and 13 form a framework for the machine, creating generally a box-like structure within which a tire, designated by the letter T, is received and tested. In that regard, the upper frame members 13 carry an upper chuck assembly 30 which includes a chuck 31 and a spindle 32 used to rotate the upper chuck assembly 30 during the testing operation. The spindle 32 of the upper chuck assembly 30 is driven by a motor 33 connected to the spindle by a belt or chain drive 34 for rotation purposes.

A lower chuck assembly 40, including a chuck 41, is mounted on lower frame members 12 and is supported on a shaft 71 which is attached to a hydraulic unit 70 which includes a piston 73 and cylinder 72 so that the lower chuck assembly can be elevated and lowered. In other words, the lower chuck assembly may be moved toward or away from the upper chuck assembly 30 so that the tire T can be chucked between the upper and lower chuck assemblies for testing purposes after being moved into the machine along a conveyor 20.

A loadwheel 50 is provided and is carried by a carriage 51 which is mounted on the frame. The loadwheel 50 is rotatively mounted on spindles 52, 52 and the spindles have associated with them load cells 60 which are used to measure certain characteristics of the tire. The carriage 51 is moveable toward and away from the tire T in the direction of the arrow 56 by means of a motor 53, a gear reduction unit 54 and drive means 55. All of this structure is essentially conventional in nature and is not described or illustrated in great detail herein since it would be well within the knowledge of one reasonably skilled in the art.

For purposes of the present invention, it is sufficient to note that, with the lower chuck assembly 40 in its retracted position, the tire T may be moved into registry with the lower chuck 41 along the conveyor 20. The lower chuck assembly 40 is then elevated so that the tire T engages the chuck 31 of upper chuck assembly 30 to firmly seat the tire. The tire is then inflated to the desired inflation pressure by suitable inflation means (not shown) and rotated by a motor 33. The loadwheel 50 can then be moved into engagement with the tire to perform various testing procedures. It will be appreciated that it is essential that the face of the loadwheel which engages the tire be precisely positioned to ensure accurate measurements.

From the foregoing description it will be appreciated that in a production test scenario of manufactured tires several different testing parameters are implemented before the tire may be shipped to a customer. Briefly, the tire is conveyed down the conveyor 20 and loaded into the chuck assembly. The tire is then pressurized and rotated, typically at 60 rpm, while a load test is applied. After completion of this test and others, the rotation of the tire is stopped and it is depressurized, unchucked and released to the other end of the conveyor. If a sidewall bulge or depression is detected during the testing process, the tire is marked accordingly. This testing procedure is repeated for each tire that is received and it will be appreciated that the cycle testing time or the time it takes to implement the entire test procedure is quite critical as the additional time taken to test the tire significantly adds to the tire's overall cost. Therefore, it is desirable to ensure that all tests are performed to the accepted industry standards in a timely manner.

It will be appreciated that multiple testing procedures can be implemented by incorporating additional structure to the machine 10. The additional structure includes a test arm 80 which is cantilevered and extending from one of the vertical side frame members 11. The test arm 80 is disposed in a position above the tire when in the received position for the general purpose of measuring the tire sidewall. In a similar manner, a test arm 82 may be positioned underneath the received tire so as to be placed in a position to measure the other tire sidewall. Attached to each end of the test arms is a respective test device 84 and 86. It will be appreciated that the test arms are configured so as to allow for radial movement of the test devices from a tread position inwardly toward the hub of the tire as it is rotated. Each of the test devices generates a respective measurement signal 88 and 90 that is received by a controller 92. It will be appreciated that the test devices in the preferred embodiment utilize lasers. Each testing device generates a pulsed laser light beam and measures the point of the returned light beam and also the intensity of the returned beam. The devices may have additional circuitry that varies the intensity of the laser beam to create a consistent intensity of the returned light beam. As the returned laser light beam intensity is decreased due to the blockage of the beam by the leading edge of a feature, the intensity circuitry increases the laser beam intensity. Such a measurement device allows for obtaining data once every two hundred fifty microseconds although it will be appreciated that different time period readings could be employed by the present invention. Although the present invention utilizes an existing tire testing machine that is modified to carry out a desired data collection and evaluation methodology, it will be appreciated that the disclosed methodology can be incorporated into a device that is configured solely for the purpose of testing sidewall irregularities.

As noted, the testing devices initially start at the outer diameter of the tire and are moved radially inward in a sequence of paths toward the inner diameter or hub of the tire. In other words, a data profile is collected at the furthest outer diameter path of the sidewall surface and upon a complete rotation both testing devices are moved radially inward at preferably an equal amount of defined increments. After each increment a data profile is collected from that path. This is done so as to allow for as many paths as possible to be tested within the normal testing cycle time so that this particular test is not adding any production cost to the manufacture of the tire. A data profile from each measurement path may include up to at least 1000 data points and typically includes 4000 data points. The measurement signals 88 and 90 are received by the controller 92 which contains the necessary hardware, software and memory for processing the data collected by the devices. As will be described in further detail, the controller implements methodologies to determine whether bulges and/or depressions are present in the tire sidewall surfaces. If such bulges or depressions are determined to be defects, then the controller generates a signal 94 which is received by the appropriate equipment maintained by the machine 10 which designates the tire under test as being defective. This may be in the form of a mark on a designated surface of the tire or with the application of a label or by conveying the tire upon completion of the testing into a re-work area for further processing. A data collection computer 96 may be connected to the controller 92 for generating test report data which may include specifics of every tire rejected and/or passed and which may provide trend information for evaluation by tire manufacturing personnel.

Figure 2:
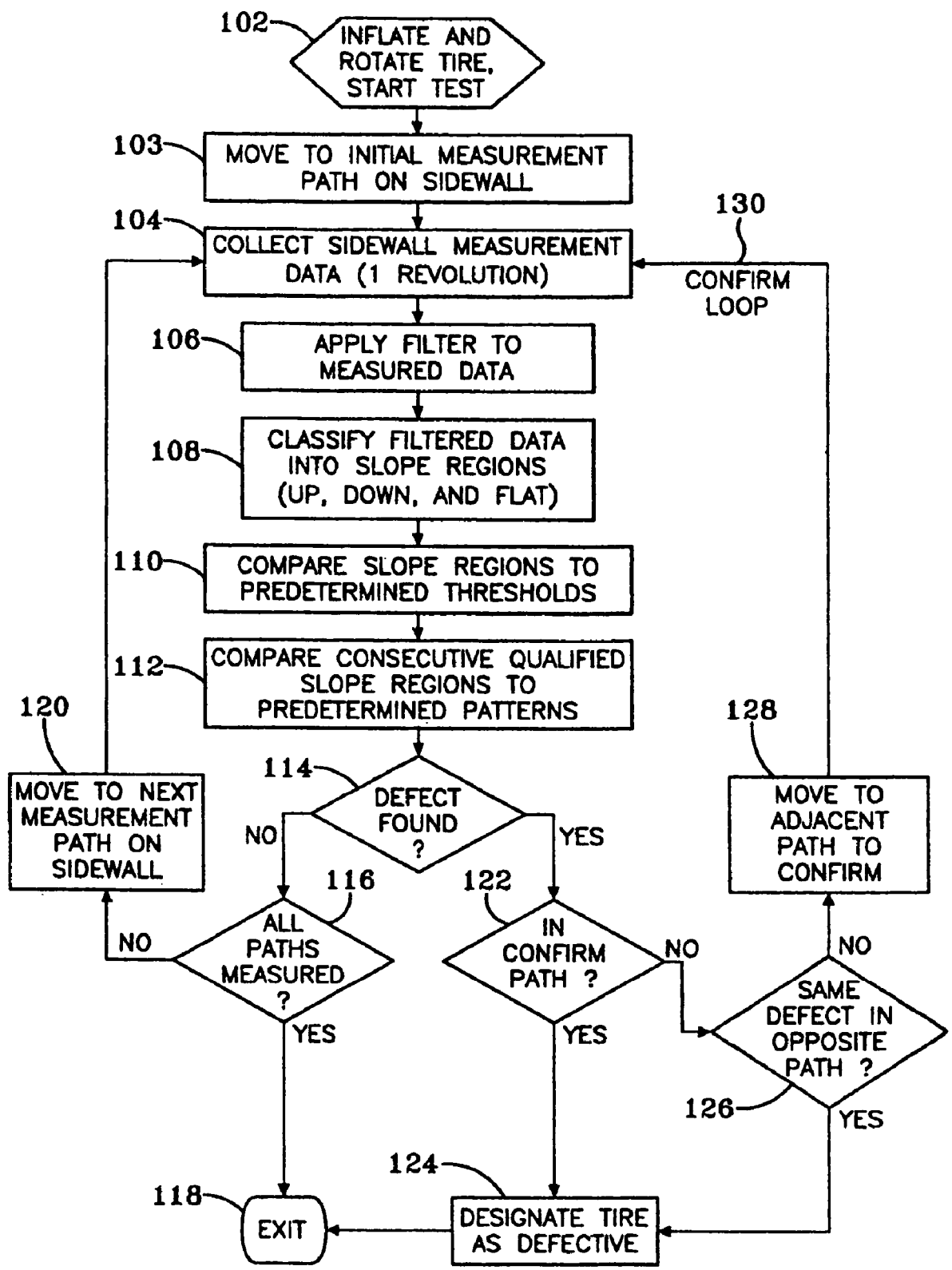
FIG. 2 shows an operational flow chart illustrating the processing steps implemented by the present invention.

Referring now to FIG. 2, the methodology for testing the tire to detect tire sidewall irregularities is designated generally by the numeral 100. As described previously, step 102 begins the test process with inflating and rotating the tire in the machine 10. At step 103, the test device is moved to the first path of the multiple paths defined for this test. At step 104, at least one of the sidewall surfaces is measured. In other words, a path of the tire sidewall surface is measured by the test device at a fixed radius from the center of the tire and upon completion of a tire rotation, the test device is moved radially inward so that the next defined path is measured at a smaller fixed radius in a similar manner. As shown in FIG. 3, an exemplary waveform is designated by the numeral 200, wherein the raw data waveform is designated by the numeral 202. Both FIGS. 2 and 3 will need to be referred to concurrently as the description proceeds. At step 106, the controller receives the data from the testing devices and applies a filter to the measured data. The filtered waveform signal is designated generally by the numeral 204. At step 108, the data that has not been filtered out is characterized into slope regions by the controller. These regions may be classified as an up region 206, a down region 208, or a flat region 210. An up slope region may be indicative of a bulge rising in the sidewall surface over a specified time period or measurement point or series of points. A corresponding down slope region may be measured from an elevated position to a less elevated position. Flat regions may also be measured wherein numerous data points provide consistently uniform measurement values.

At step 110, the controller compares the slope regions detected to predetermined thresholds. In other words, if these slope regions are deemed to be excessive or out of the norm as determined by previous histories and database thresholds, then these regions are removed from the analysis. For example, the slope regions are compared to predetermined values and if a distinctly sharp up slope or down slope is detected then that region is ignored or removed from the analysis. These "sharp" regions are presumed to be associated with lettering or purposefully raised surfaces on the tire sidewall surface. The remaining slope regions are then compared to predetermined patterns, at step 112, that are indicative of bulges or depressions. A pattern that includes a consecutive flat slope, up slope, flat slope, down slope and a flat slope is likely a bulge. A pattern that includes a consecutive flat slope, down slope, flat slope, up slope and a flat slope is likely a depression. It will be appreciated that the slope regions within the pattern likely meet predetermined thresholds. For example, the flat slopes that define the apex or valley positions for the bulge or depression, respectively, are likely shorter than the other flat slope regions in the pattern. After all of the regions in a measurement path are evaluated, the controller, at step 114, determines whether a defect has been found or not. If a defect has not been found then the process continues with the next defined path at step 116. If no more paths are defined, then the process exits at step 118. When more paths are defined, the test device is moved to the next path at step 120 and the process repeats at step 104.

If at step 114 a defect is found, then process continues to step 122. Since the defect was found in the initial defined path, and not yet in a confirming path, the process continues to step 126 wherein the controller attempts to confirm the defect by checking the measurement profile from the opposite sidewall surface. The opposite sidewall surface may be measured simultaneously by a second test device which is positioned at the same radial distance from the center of the tire. If the same defect is found in the opposite path, thus confirming it, the tire is designated as defective at step 124 and then the process exits at step 118. However, if at step 126 the defect is not confirmed by the opposite path, the process continues to step 128 wherein the controller attempts to confirm the defect by checking adjacent paths that are closer to the current path than the next defined path. In other words, the controller checks those paths immediately adjacent the measurement path which has a defect contained therein and in the same general radial region. For example, if the normal next defined path is 0.5 inches from the current path, an adjacent confirming path, after detecting a potential defect, may be 0.1 inch. Upon completion of the repeating of the confirmation loop 130 (steps 104-112), at step 114, if a second defect is found in about the same radial region then defect is confirmed and the tire is designated as defective at step 124. In other words, the regions 206, 208 and 210, which are in the measurement point region of about 130 to about 170 in FIG. 3, are analyzed in the adjacent path to see if the same type of defect is found. If, however, at step 114 a second defect is not found in an adjacent confirming path then the process continues with the next defined path at step 116. If no more paths are defined, then the process exits at step 118. Analysis of an adjacent or opposite path with a perceived defect provides confirmation of the defect and ensures that the first detected defect is not attributable to lettering or other acceptable process-related sidewall surface features.

Based upon the foregoing, the advantages of the present invention are readily apparent. Analyzing multiple paths of the tire sidewalls enables the ability to distinguish between bulges and depressions as opposed to lettering or other acceptable process-related surface features. It will be appreciated that by utilizing the filter and the subsequent classification of the remaining measurement data into qualified slope regions, that the distinct changes from a surface to raised lettering or other acceptable process-related surface features will not qualify for the slope regions and such data is eliminated from consideration as containing a defect. This eliminates the need for comparison to a template containing a tire's sculptural sidewall features and allows for testing of various types of tires over the same piece of equipment without modification to the testing parameters.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A device for testing a tire that has a tread and extending sidewalls comprising:
    an apparatus for receiving and rotating a tire;
    at least one measurement device operatively placed to measure at least one of the sidewalls as the tire is rotated, wherein said measurement device is radially moveable with respect to the sidewall in defined increments so as to obtain a measurement profile for each radial position, and
    a controller connected to said measurement device and receiving each said measurement profile, wherein said controller classifies said measurement profile into slope classifications, and wherein said controller monitors said slope classifications for defective patterns and, when detected, monitors a second measurement profile for another defective pattern, and, when said another defective pattern is detected in about the same radial position, said controller generates an indication that the tire is defective.

2. The device according to claim 1, wherein said second measurement profile is immediately adjacent said measurement profile detected as having said defective pattern.

3. The device according to claim 2, wherein said second measurement profile is taken at a position less than said defined increment.

4. The device according to claim 1, further comprising, a second measurement device operatively placed to measure the sidewall opposite the sidewall measured by said at least one measurement device, said second measurement device radially moveable with respect to the opposite sidewall in defined increments so as to obtain an opposite sidewall measurement profile for each radial position.

5. The device according to claim 4, wherein said second measurement profile is take from a radial position from the opposite sidewall, and wherein said controller monitors for said another defective pattern.

6. The device according to claim 1, wherein said controller applies a filter to said measurement profiles prior to their classification.

7. The device according to claim 1, wherein said slope classifications comprise an up slope, a flat slope and a down slope.

8. The device according to claim 7, wherein one of said defective patterns is a bulge pattern which comprises a first flat slope immediately followed by an up slope, immediately followed by a second flat slope, immediately followed by a down slope, and then immediately followed by a third flat slope.

9. The device according to claim 8, wherein said slopes in said bulge pattern are within predetermined slope thresholds stored in said controller.

10. The device according to claim 7, wherein one of said defective patterns is a depression pattern which comprises a first flat slope immediately followed by a down slope, immediately followed by a second flat slope immediately followed by an up slope, immediately followed by a third flat slope.

11. The device according to claim 10, wherein said slopes in said depression pattern are within predetermined slope thresholds stored in said controller.

12. A method for detecting irregularities in a surface, comprising:
positioning a measuring device in relation to the surface to be measured;
moving said measuring device in radial increments with respect to the surface;
collecting a plurality of data points from each radial increment during said moving step which collectively form a measurement profile;
classifying said measurement profile into slope classifications;
comparing said slope classifications to defective patterns,
initially designating the surface as defective when a defective pattern is found in any of said measurement profiles from each radial increment
incrementally moving said measuring device with respect to the surface after said comparing step;
collecting another plurality of data points in about a substantially same radial region to form another measurement profile only when a defective pattern has been found in said comparing step;
classifying said another measurement profile into slope classifications;
comparing said slope classifications from said another measurement profile to defective patterns; and
designating the surface as defective only when said another measurement profile is found to contain one of said defective patterns in said same radial region.

13. The method according to claim 12, further comprising rotating the surface during said collecting step.

14. The method according to claim 12, wherein said incrementally moving step moves the measuring device in the same plane.

15. The method according to claim 14, wherein said incrementally moving step is less than a normal incremental amount if the surface as considered defective.

16. The method according to claim 15, further comprising:
filtering said measurement profile; and
designating said slope classifications as an up slope, a down slope, and a flat slope.

17. The method according to claim 16, further comprising:
designating one of said defective patterns as a bulge pattern which comprises a first flat slope immediately followed by an up slope, immediately followed by a second flat slope, immediately followed by a down slope, immediately followed by a third flat slope, and wherein all of said slopes in said bulge pattern are within predetermined slope thresholds stored in said controller.

18. The method according to claim 16, further comprising:
designating one of said defective patterns as a depression pattern which comprises a first flat slope immediately followed by a down slope, immediately followed by a second flat slope immediately followed by an up slope, immediately followed by a third flat slope, and wherein all of said slopes in said depression pattern are within predetermined slope thresholds stored in said controller.

19. A method for detecting irregularities in a surface wherein the surface is a tire sidewall having opposed sides, the method comprising;
positioning a first measuring device in relation to one of the opposed sides to be measured;
moving said first measuring device in radial increments with respect to one of the opposed sides,
collecting a plurality of data points from each radial increment during said moving step which collectively form a first measurement profile;
classifying said first measurement profile into slope classifications;
comparing said slope classifications to defective patterns,
positioning a second measuring device in relation to the other of the opposed sides;
collecting another plurality of data points from said second measuring device to from another measurement profile;
classifying said another measurement profile into slope classifications, and
comparing said slope classifications from said another measurement profile to defective pattern;

simultaneously obtaining said first measurement profile and said another measurement profile; and designating the surface as defective only when both said measurement profiles contain one of said defective patterns.

20. The method according to claim 19, further comprising:

filtering said measurement profiles;

designating said slope classifications as an up slope, a down slope, and a flat slope, and designating one of said defective patterns as a bulge pattern which comprises a first flat slope immediately followed by an up slope, immediately followed by a second flat slope, immediately followed by a down slope, immediately followed by a third flat slope, and wherein all of said slopes in said bulge pattern are within predetermined slope thresholds stored in said controller.

21. The method according to claim 19, further comprising.

filtering said measurement profiles;

designating said slope classifications as an up slope a down slope, and a flat slope; and designating one of said defective patterns as a depression pattern which comprises a first let slope immediately followed by a down slope, immediately followed by a second flat slope, immediately followed by an up slope, immediately followed by a third flat slope, and wherein all of said slopes in said depression pattern are within predetermined slope thresholds stored in said controller.

22. The method according to claim 19, further comprising:

comparing one of said measurement profiles for defective patterns only if the other of said measurement profiles is determined to have said defective pattern.

23. A device for testing a tire that has a tread and extending sidewalls comprising:

an apparatus for receiving and routing at tire;

at least one measurement device operatively placed to measure at least one of the sidewalls as the tire is rotated, wherein said measurement device is radially moveable with respect to the sidewall in defined increments so as to obtain a measurement profile for each radial position; and a controller connected to said measurement device and receiving each said measurement profile, wherein said controller monitors said measurement profile for defective patterns and, when detected, monitors a second measurement profile for another defective pattern, and, when said another defective pattern is detected in about the same radial position, said controller generates an indication that the tire is defective.

24. The device according to claim 23, wherein said second measurement profile is immediately adjacent said measurement profile detected as having said defective pattern.

25. The device according to claim 24, wherein said second measurement profile is taken at a position less than said defined increment.

26. The device according to claim 23, further comprising:

a second measurement device operatively placed to measure the sidewall opposite the sidewall measured by said at least one measurement device, said second measurement device radially moveable with respect to the opposite sidewall an defined increments so as to obtain an opposite sidewall measurement profile for each radial position.

27. The device according to claim 26, wherein said second measurement profile is taken from a radial position from the opposite sidewall, and wherein said controller monitors for said another defective pattern.

28. A method for detecting irregularities an a surface, comprising:

positioning a measuring device in relation to the surface to be measured;

moving one of said measuring device and the surface;

collecting a plurality of data points during said moving step which collectively form a first measurement profile;

comparing said first measurement profile to defective patterns;

incrementally moving one of said measuring device and the surface in the same plane after said comparing step when said first measurement profile matches a defective pattern;

collecting another plurality of data points in about a substantially same radial region to form a second measurement profile;

comparing said second measurement profile to defective patterns; and designating the surface as defective only when said second measurement profile is found to contain one of said defective patterns in said same radial region, wherein said incrementally moving step is less than a normal incremental amount when the surface is considered defective.

29. The method according to claim 28, further comprising:

rotating the surface during said collecting step.

30. The method according to claim 28, positioning a second measuring device in relation to the surface to be measured, wherein the surface is a tire sidewall having opposed sides, the method further comprising:

positioning a first measuring device in relation to one of the opposed sides and positioning a second measuring device in relation to the other of the opposed sides, said first measuring device obtaining said first measurement profile;

collecting another plurality of data points from said second measuring device to form said second measurement profile; and comparing said second measurement profile to defective patterns.

31. The method according to claim 30, further comprising:

simultaneously obtaining said first measurement profile and said second measurement profile; and designating the surface as defective only if both said measurement profiles contain one of said defective pattern.

32. The method according to claim 30, further comprising:

simultaneously obtaining said first measurement profile and said second measurement profile; and comparing one of said measurement profiles for defective patterns only if the other of said measurement profiles is determined to have said defective pattern.

* * * * *

UNITED STATES PATENT AND TRADEMARK OFFICE
CERTIFICATE OF CORRECTION

PATENT NO. : 7,369,956 B2
APPLICATION NO. : 11/260033
DATED : May 6, 2008
INVENTOR(S) : Brandon M. Reynolds and Troy L. Anenson It is certified that error appears in the above-identified patent and that said Letters Patent is hereby corrected as shown below:

In Column 7, line 62 (Claim 12) the punctuation mark "," after the word patterns should read --;--
In Column 8, line 19 (Claim 15) the word "as" should read --is--
In Column 8, line 62 (Claim 19) the word "from" should read --form--
In Column 8, line 65 (Claim 19) the punctuation mark "," should read --;--
In Column 8, line 67 (Claim 19) the word "pattern" should read --patterns--
In Column 9, line 25 (Claim 21) the word "let" should read --flat--
In Column 9, line 39 (Claim 23) the word "routing at" should read --rotating a--
In Column 9, line 65 (Claim 26) the word "an" should read --in--
In Column 10, line 6 (Claim 28) the word "an" should read --in--
In Column 10, line 57 (Claim 31) the word "pattern" should read --patterns--

Signed and Sealed this

Nineteenth Day of August, 2008

JON W. DUDAS
*Director of the United States Patent and Trademark Office*